United States Patent [19]
Suzuki et al.

[11] Patent Number: 6,079,035
[45] Date of Patent: Jun. 20, 2000

[54] PARALLEL DATA SKEW DETECTING CIRCUIT

[75] Inventors: Osamu Suzuki, Kamakura; Takayuki Watanabe, Tokyo, both of Japan

[73] Assignee: Fujitsu Limited, Kawasaki, Japan

[21] Appl. No.: 09/035,924

[22] Filed: Mar. 6, 1998

[30] Foreign Application Priority Data

Sep. 1, 1997 [JP] Japan .................................. 9-235752

[51] Int. Cl.[7] .............................................. G11B 20/20
[52] U.S. Cl. ........................................ 714/700; 327/261
[58] Field of Search ................................ 714/700; 327/73, 327/514, 141, 261, 269, 393

[56] References Cited

U.S. PATENT DOCUMENTS

| | | | |
|---|---|---|---|
| 4,646,297 | 2/1987 | Palmquist et al. ............... | 714/700 |
| 4,833,346 | 5/1989 | Marple .............................. | 327/73 |
| 5,157,530 | 10/1992 | Loeb et al. ....................... | 714/700 |
| 5,436,908 | 7/1995 | Fluker et al. .................... | 714/700 |
| 5,524,218 | 6/1996 | Byers et al. ..................... | 710/729 |

*Primary Examiner*—Emmanuel L. Moise
*Attorney, Agent, or Firm*—Staas & Halsey LLP

[57] ABSTRACT

A sample signal is sequentially transported through a plurality of serial shift registers in respective data channels. The sample signal varies between a pair of levels, namely a first level and a second level, to resemble a step with respect to time. The shift registers are monitored by a skew detection circuit to identify the shift register that receives the sample signal at the time of a generated timing signal. Data signals are then passed through the recorded shift register while compensating for detected skew in parallel transmission data.

7 Claims, 11 Drawing Sheets

PARALLEL DATA SKEW DETECTING CIRCUIT

BACKGROUND OF THE INVENTION

1. Field of the Invention

The present invention relates to a receiver capable of receiving parallel data signals through a plurality of data channels, more particularly, to a parallel data skew detecting circuit capable of detecting a skew in parallel data.

2. Description of the Prior Art

It is well known in the field of computer technology to provide a parallel interface in which data signals are transported over parallel copper cables or fiber-optic cables, so as to simultaneously transport as many data signals as possible.

Data signals in the parallel interface are, however, not always received by a receiver in all data channels at the same time, even if the data signals are simultaneously transmitted in synchronization with the system clock of a transmitter.

When the parallel interface employs parallel fiber-optic cables, in particular, skew tends to occur in parallel transmission data, which should be processed in parallel later, based on a difference in transmission speed of data signals within the fiber-optic cables, a difference in processing speed of photodetectors for converting optical signals into electrical signals, and so on. The longer the fiber-optic cables, the larger the skew.

SUMMARY OF THE INVENTION

An object of the present invention is, accordingly, to provide a parallel data skew detecting circuit capable of simultaneously outputting parallel transmission data, which should be simultaneously processed later, by detecting skew in parallel transmission data and compensating the skew.

According to the present invention, a parallel data skew detecting circuit includes: a plurality of parallel data channels including a plurality of serial shift registers for passing a sample signal; a timing signal generating circuit generated a timing signal in a predetermined period; and a skew storage circuit to record the shift register which receives the sample signal for the respective data channels when the timing signal is generated.

With the above structure, the shift register which receives the sample signal at the time of generating the timing signal can be identified among the shift registers sequentially transporting the received sample signal in each of the data channels. The sample signals output from the identified shift registers are simultaneously output from all of the data channels. Skew can accordingly be detected in the parallel transmission data.

The sample signal preferably includes at least an edge rising up to a data value level, and a constant level portion keeping the data value level continuous to the edge. The skew storage circuit monitors the shift register which receives the sample signal based on the edge of the sample signal. As long as the data value level is maintained, only one of the shift registers can be extracted in each of the data channels.

The timing signal generating circuit generates the timing signal for allowing the shift register which receives the sample signal to be identified, when all of the data channels receive the sample signals. The sample signals input into the respective data channels are then simultaneously output from all of the data channels. In this case, the timing signal generating circuit may receive a reset signal for resetting the skew storage circuit. The reset signal serves to initiate the parallel data skew detecting circuit.

In addition, the parallel data skew detecting circuit further includes a processing completion detecting circuit capable of detecting that all of the data channels receive the sample signals within a skew detecting period defined by the number of the shift registers, so as to output a completion signal. The completion signal serves to confirm that skew is detected within the skew detecting period.

Further, the parallel data skew detecting circuit further includes an incomplete channel detecting circuit capable of detecting the data channel in which the sample signal has passed through all of the shift registers when the processing completion detecting circuit fails to output the completion signal. With this structure, when the detection of skew is incomplete within the skew detecting period, it is possible to identify the data channel which induces the incompletion.

Furthermore, the parallel data skew detecting circuit further includes a gate circuit capable of allowing a coming data signal to output from the shift register recorded in the skew storage circuit in the data channel. Once the shift registers are recorded in all of the data channels based on the sample signal, subsequent data signals are guided through the recorded shift registers so as to synchronize with one another. Skew can accordingly be compensated in the parallel transmission data in this way.

Furthermore, the data channels may be connected to an optical converter circuit to convert an optical signal into an electric signal. The skew compensation can then be effected on parallel transmission data suffering from skew caused by a medium such as a fiber-optic cable.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
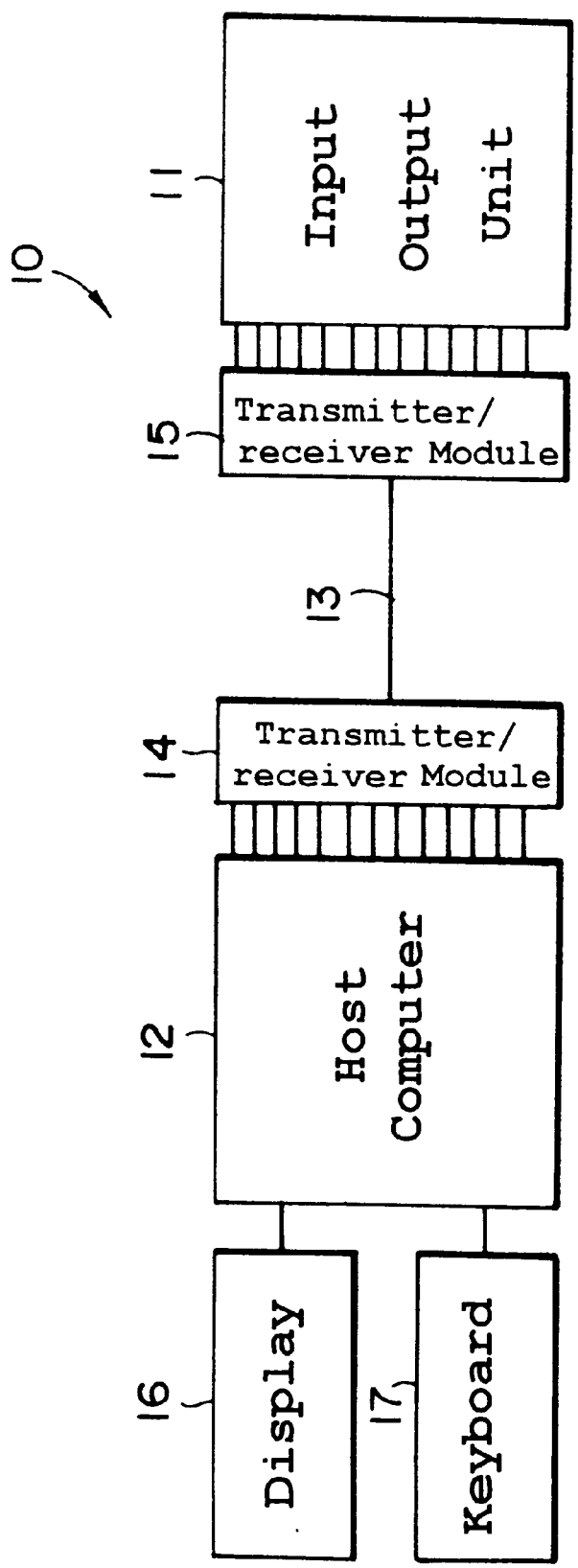
FIG. 1 schematically illustrates the structure of a computer system employing parallel interface.

FIG. 1 illustrates an example of a computer system employing a parallel interface. The computer system 10 comprises a host computer 12 capable of capturing data from an input/output unit 11 and processing the data. The input/output unit 11 may include, for example, a magnetic tape control apparatus and a file management apparatus comprising a plurality of disk drive units. The host computer 12 and the input/output unit 11 are connected to each other through a fiber-optic ribbon (fiber-optic tape) 13 having twelve lines, for example. Electric signals output from the host computer 12 are converted into optical signals at an optical transmitter/receiver module 14, and thereafter transmitted to the input/output unit 11 through the fiber-optic ribbon 13. The input/output unit 11 allows an optical transmitter/receiver module 15 to likewise convert the transferred optical signals into electric signals, which are thereafter subjected to processing. On the other hand, data signals converted into optical signals at the optical transmitter/receiver module 15 in the input/output unit 11 are subjected to the restoration into electric signals at the optical transmitter/receiver module 14 for the host computer 12. The restored data signals are thereafter processed in the host computer 12. The optical transmitter/receiver modules 14, 15 may be built in or detachably mounted to the host computer 12 and input/output unit 11. The host computer 12 may be operated through visual indications on a display 16 and/or input manipulation of a keyboard 17, a mouse, not shown, and the like.

Figure 2:
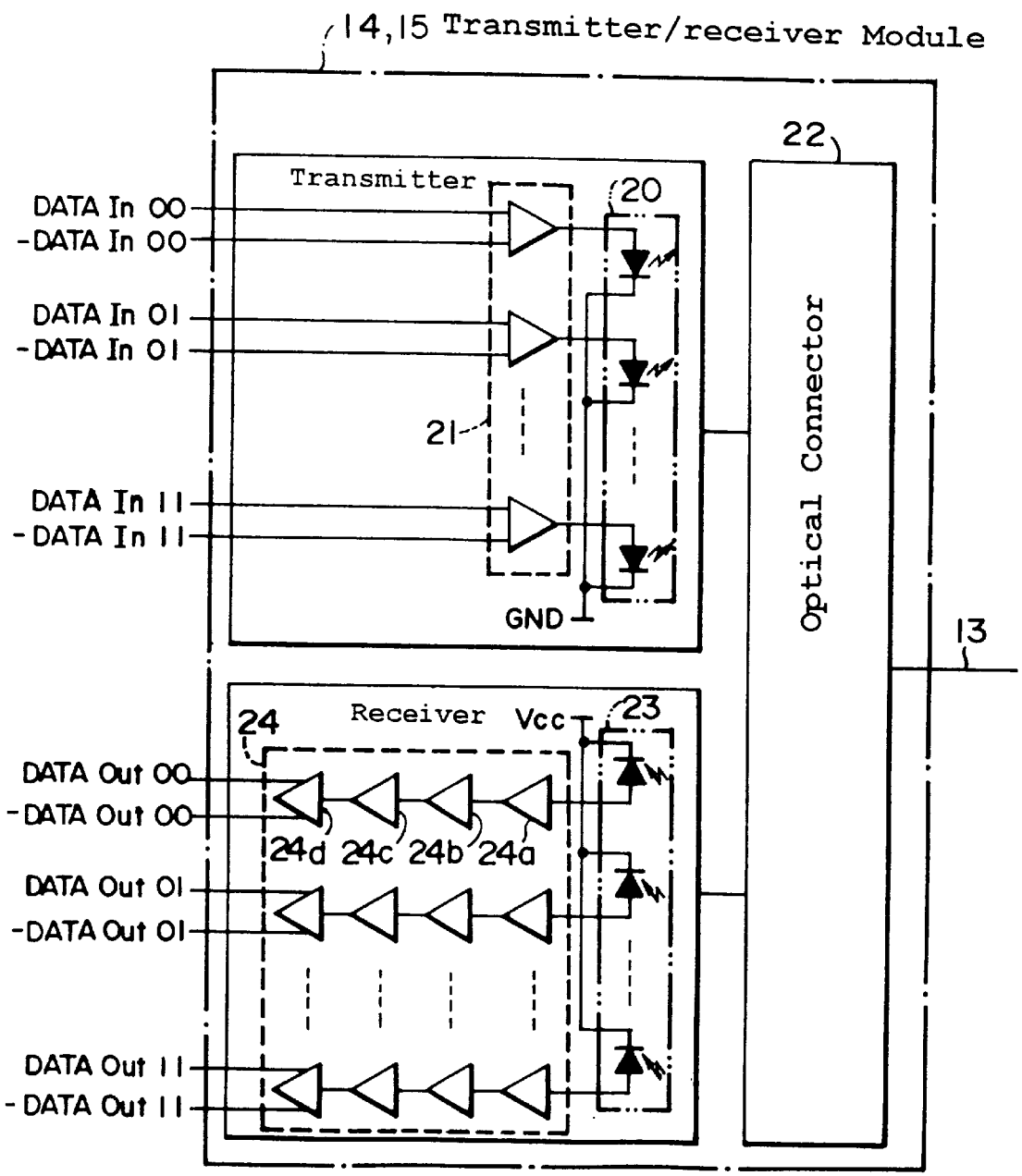
FIG. 2 schematically illustrates the structure of an optical transmitter/receiver module.

Each of the optical transmitter/receiver modules 14, 15 includes, as shown in FIG. 2, a laser driver 21 for blinking or intensity-modulating a laser array 20 in synchronization with a system clock. The laser array 20 comprises laser elements or diodes for converting electric signals into optical signals for parallel data DATAIn00-DATAIn11. Each of the elements corresponds to one bit of the parallel data out of twelve bits comprising a clock signal of 1 bit and data signals of 11 bits. The blink of each of the laser elements is transmitted through an optical connector 22 to the corresponding line in the fiber-optic ribbon 13. On the other hand, a photodetector array 23 as optical converter circuit converts blinks into electric signals. The blinks are received from the corresponding lines in the fiber-optic ribbon 13. The obtained electric signals are then amplified in a receiver circuit 24, and thereafter supplied to the host computer 12 or input/output unit 11 as parallel data DATAOut00-DATAOut11 of twelve bits. The receiver circuit 24 may comprise, for example, a preamplifier 24a, a main amplifier 24b, a comparator 24c and a driver 24d.

Figure 3:
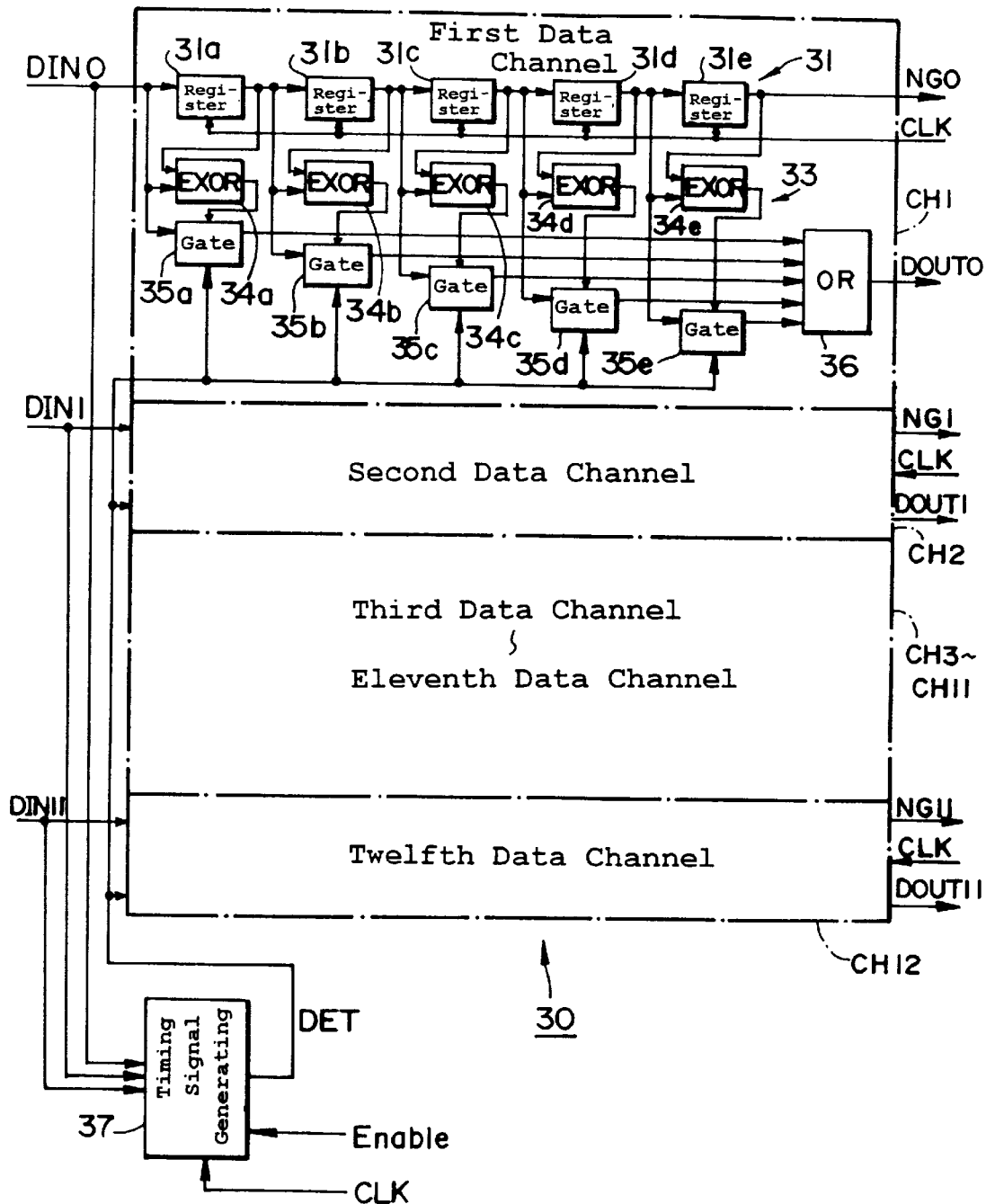
FIG. 3 schematically illustrates the structure of a parallel data skew detecting circuit according to the present invention.

The receiver circuit 24 comprises a parallel data skew detecting circuit 30 according to an embodiment of the present invention as shown in FIG. 3. The parallel data skew detecting circuit 30 includes a plurality of (twelve in this case) data channels CH1–CH12 in which corresponding data signals DIN01–DIN11 are transported from the lines in the fiber-optic ribbon 13. Here, the description will be made only to the first data channel CH1 since the data channels CH1–CH12 have the same structure.

A shift register set 31 is connected to the first data channel CH1. The shift register set 31 comprises a plurality of serial shift registers 31a14 31e. Each of the shift registers 31a–31e sequentially outputs received data signal DIN0 in synchronization with a sampling clock CLK supplied from a sampling clock generating circuit, not shown. The sampling clock is different from the system clock or the clock included in the data transmission signal.

A skew storage circuit 33 is connected to the shift register set 31. The skew storage circuit 33 comprises exclusive OR circuits (EXORs) 34a–34e each for comparing an output data value from the corresponding shift register 31a–31e with an input data value to the corresponding shift register 31a–31e. The exclusive OR circuits 34a–34e output a high level signal if the output data value is different from the input data value as the result of the comparison. The comparison serves to identify the particular shift register 31a–31e, which outputs data signal of the data value different from the input data value, out of the shift register set 31.

Logic gate circuits 35a–35e are connected to the corresponding exclusive OR circuits 34a–34e. The logic gate circuits 35a–35e serve to identify the exclusive OR circuit 34a–34e which outputs the high level signal when a skew recording instruction signal DET is supplied. The output from the logic gate circuit 35a–35e is supplied to an OR circuit 36. The skew recording instruction signal DET is supplied from a timing signal generating circuit 37 as described later.

The description will next be made to the operation of the parallel data skew detecting circuit 30 of the present invention. Assume that the data transmission rate of 1 GHz is established between the host computer 12 and input/output unit 11. The operator first inputs the execution instructions of skew detecting operation to the host computer 12 with the keyboard 17 in aid of the graphical indications on the display 16 after the host computer 12 and input/output unit 11 are turned on. The execution of skew detecting operation may be made when the host computer 12 is settled, and/or every time the host computer 12 is turned on. The execution of skew detecting operation may be automatically made when the host computer 12 is turned on, without instructions from the operator. The execution may be periodically made under the automatic control of the host computer 12.

When the execution instructions are input, the host computer 12 supplies a reset signal to the parallel data skew detecting circuit 30 in the optical transmitter/receiver module 14 and a signal for indicating the beginning of the skew detecting operation toward the input/output unit 11. The signal for indicating the beginning of the skew detecting operation may include, for example, a power-on-reset which is generated when the system is turned on. The power-on-reset is transmitted from the host computer 12 to the input/output unit 11 over a line for power supply control, not shown, which line is independent from the passage of the data transmission. A reset signal is supplied to the parallel data skew detecting circuit 30 in response to the signal in the optical transmitter/receiver module 15 for the input/output unit 11. These reset signals serve to reset all of the logic gate circuits 35a–35e. When the timing signal generating circuit 37 receives the reset signal Enable, it starts to operate.

The host computer 12 then outputs a sample signal to the input/output unit 11. The sample signal preferably comprises, for example, an edge 40 rising up to a data value level, and a constant level portion 41 keeping the data value level continuous to the edge 40, as is apparent from DIN0 in FIG. 4. The constant level portion 41 is maintained until a transmission path is established in the respective data channels of the parallel data skew detecting circuit 30 which receives the sample signal. Since the structure or design of the skew detecting circuit may restrict the maximum time required to compensate skew, the period of the constant level portion 41 can be determined at a predetermined duration. For example, HIPPI-6400-PH Rev 0.5 proposes the constant level portion 41 of 14 ns.

Suppose that the sample signal reaches the second data channel CH2 3ns later than the first data channel CH1. Here, the third to twelfth data channels CH3–CH12 are supposed to receive the sample data simultaneously with the receipt in either of the first or second data channel CH1, CH2.

Figure 4:
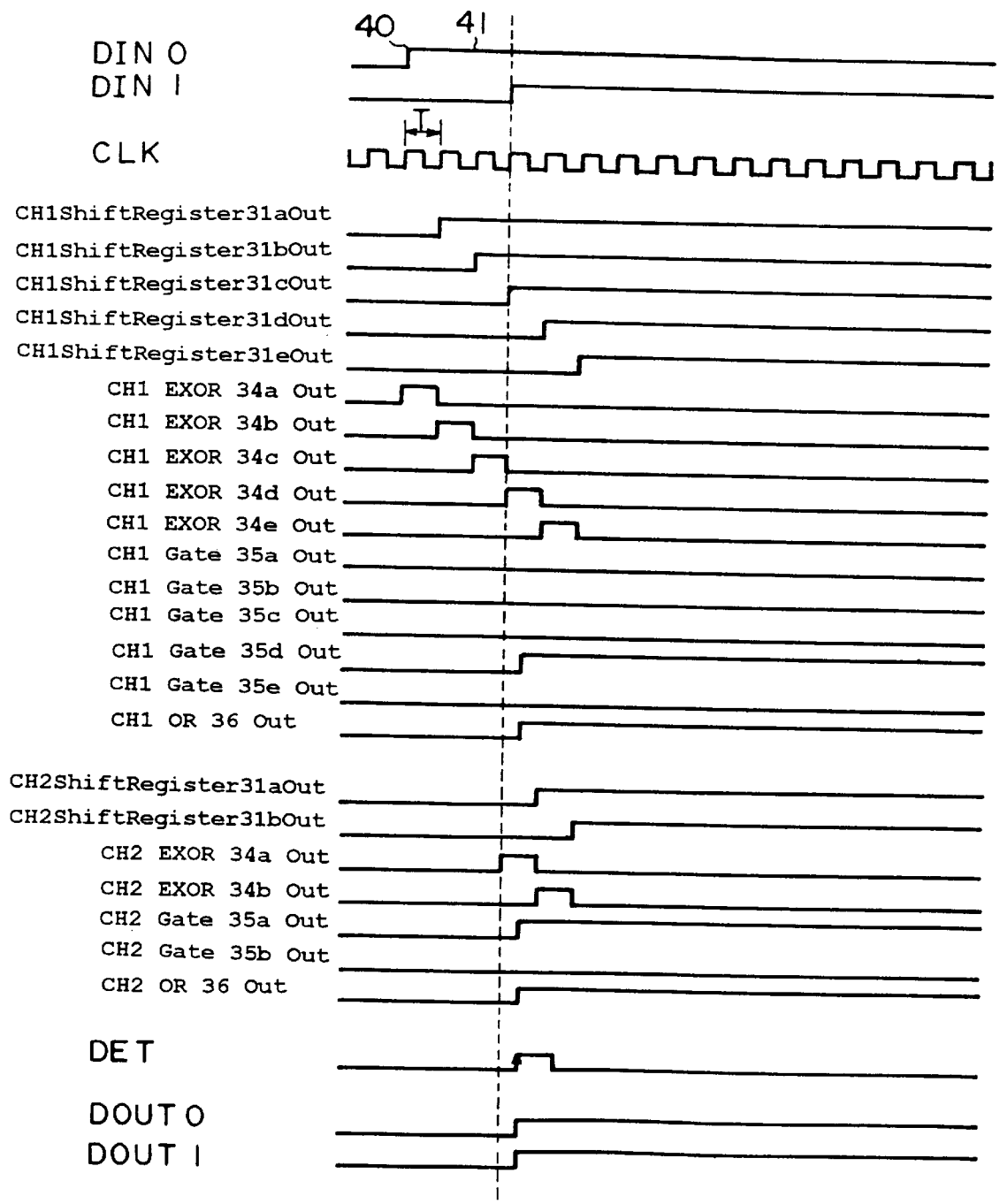
FIG. 4 is a timing chart for showing the operation of the parallel data skew detecting circuit.

Each of the shift registers 31a–31e initially outputs a low level signal in synchronization with the sampling clock CLK of 1 GHz (T=1 ns) in the respective data channels CH1–CH12. When the sample signal arrives, as shown in FIG. 4, the data signal on the input side of the first shift register 31a, corresponding namely to DIN0, rises up while the data signal on the output side is maintained at the low level. As a result, the first exclusive OR circuit 34a outputs a high level pulse signal of 1 ns. The first shift register 31a then outputs a high level signal in the next period of the sampling clock CLK. Accordingly, the second exclusive OR circuit 34b compares the high level signal on the input side of the second shift register 31b with the low level signal on the output side thereof, so that the second exclusive OR circuit 34b likewise outputs a high level pulse signal of 1 ns. The shift register 31a–31e which outputs the sample signal can be sequentially identified in this way by repeating the above described operation.

The timing signal generating circuit 37 supplies a skew recording instruction signal DET to the respective logic gate circuits 35a–35e in synchronization with the fall of the sampling clock CLK when the sample signal reaches all of the data channels CH1–CH12. The skew recording instruction signal DET is maintained at a high level in 1 ns. If the logic gate circuit 35a–35e receives the skew recording instruction signal DET while the corresponding exclusive OR circuit 34a–34e outputs the high level signal, the logic gate circuit 35a–35e records the corresponding shift register 31a–31e which outputs the sample signal. The logic gate circuit 35a–35e establishes a data path for supplying the output from the recorded shift register 31a–31e to the OR circuit 36.

In this example, the fourth exclusive OR circuit 34d outputs the high level pulse signal at the time of output of the skew recording instruction signal DET in the first data channel CH1, as shown in FIG. 4, so that the fourth logic gate circuit 35d establishes a data path. In other words, the third shift register 31c is recorded so as to allow its output to pass through the OR circuit 36 as a data signal DOUT0. On the other hand, the first exclusive OR circuit 34a outputs the high level pulse signal at the time of output of the skew recording instruction signal DET in the second data channel CH2, so that a data signal DIN1 passes through the first logic gate circuit 35a to the OR circuit 36. The OR circuit 36 outputs the received data signal DIN1 as a data signal DOUT1.

As described above, the data signal DIN0 is retained for 1 ns at each of the shift registers 31a–31c in the first data channel CH1 until the data signal DOUT1 is output from the second data channel CH2. Accordingly, the data signals DOUT0, DOUT1 are simultaneously output from the first and second data channels CH1, CH2, as shown in FIG. 4. A data path is recorded to compensate a skew of 3 ns in this way. When data is supplied afterwards, parallel transmission data without skew can be obtained by allowing the data signal to pass through the recorded logic gate circuit 35d.

After the skew has been compensated at the optical transmitter/receiver module 15 in the above manner, a sample signal is supplied from the input/output unit 11 to the optical transmitter/receiver module 14 for the host computer 12. The transmitter/receiver module 14 is likewise subjected to the compensation of skew, so that parallel transmission data without skew can be obtained for the host computer 12 afterwards.

Figure 5:
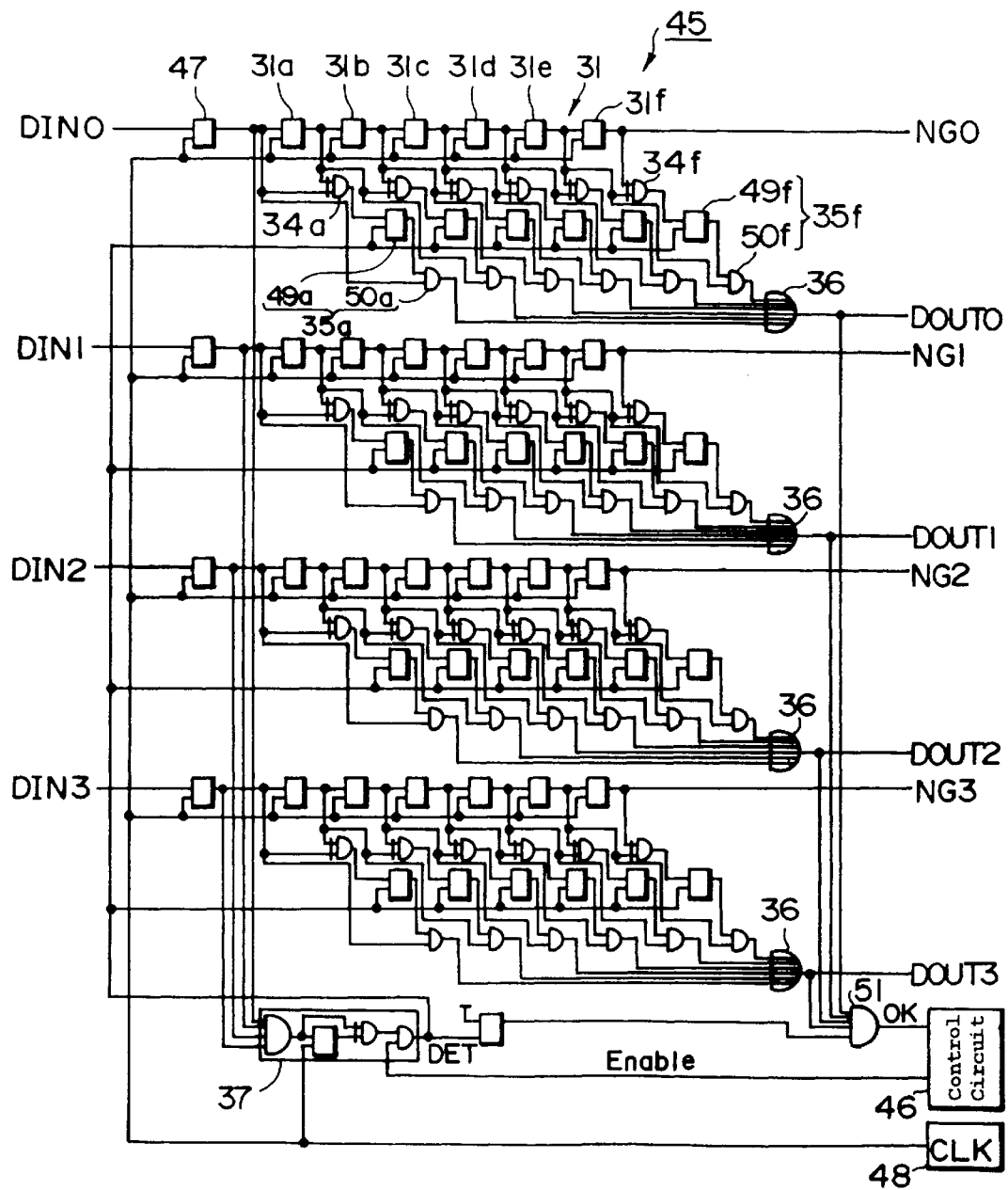
FIG. 5 schematically illustrates the structure of a parallel data skew detecting circuit according to another embodiment of the present invention.

FIG. 5 illustrates another embodiment of a parallel data skew detecting circuit 45. Only four channels CH1–CH4 are shown in FIG. 5 for simplifying the below explanation. The respective data channels CH1–CH4 comprise, in the same manner as the aforementioned embodiment, the shift register set 31 comprising six shift registers or flip-flops 31a–31f, and the corresponding exclusive OR circuits 34a–34f for identifying the shift register 31a–31f which outputs the sample signal. The outputs NG0–NG3 from the last shift registers 31f are supplied to a control circuit 46. The data signals DIN0–DIN3 supplied to the parallel data skew detecting circuit 45 are initially synchronized with the sampling clock CLK from the sampling clock generating circuit 48 by the operation of flip-flops 47.

The logic gate circuits 35a–35f each comprises a flip-flop 49a–49f for allowing the output from the corresponding exclusive OR circuit 34a–34f to pass through in response to receipt of the skew recording instruction signal DET from the timing signal generating circuit 37, and a logic AND circuit 50a–50f for maintaining the activation in response to receipt of a high level signal from the flip-flop 49a–49b. The logic AND circuits 50a–50f have a first input terminal for receiving a signal same as input signal to the corresponding shift register 35a–35f, and a second input terminal for receiving the output from the corresponding flip-flop 49a–49f.

The outputs DOUT0-DOUT3 from the respective OR circuits 36 in the data channels CH1–CH4 are supplied to a processing completion detecting circuit 51. The processing completion detecting circuit 51 supplies an OK signal or a completion signal to the control circuit 46 if the circuit 51 receives high level signals from all of the OR circuit 36 at the time of output of the skew recording instruction signal DET from the timing signal generating circuit 37.

It should be noted that the same reference characters or numerals are attached to the structure having functions same as those in the aforementioned embodiment.

Assume the case in which the parallel data skew detecting circuit 45 conducts skew compensation to data signals of 1 GHz, and the sampling clock CLK has a period T=1 ns (rate of 1 GHz), for example. The data signals are sequentially transported from one shift register to the other by 1 ns in the shift register set 31. The data signals DIN0–DIN3 can accordingly be retained in the shift register set 31 for 6 ns at the maximum. In other words, the maximum 6ns of skew can be compensated in this parallel data skew detecting circuit 45. This time period is defined as a skew detecting period in the below explanation.

Here, suppose the case in which the duration of skew exceeds the skew detecting period by referring to FIG. 5. The sample signal is in this case not received by all of the data channels CH1–CH4 within the skew detecting period, so that the processing completion detecting circuit 51 fails to output the OK signal. When the control circuit 46 detects this condition, it finds out which one of the data channels CH1–CH4 receives the sample signal too early. In other words, the control circuit 46 finds out the data channel CH1–CH4 which outputs the data signal NG0–NG3 of a high level at the expiration of the skew detecting period. The high level signal represents the sample signal completely passing through the shift register set 31 before all of the data channels CH1–CH4 receive the sample signal, so that the data channel CH1–CH4 which has received the sample signal too early can be identified. Here, the control circuit 46 serves to operate as an incomplete channel detecting circuit of the present invention.

Next, the description will be made for the case in which the flip-flop 47 in the second data channel CH2 receives the sample signal 250 ps later than the flip-flop 47 in the first data channel CH1, referring to FIG. 6. The sample signal DIN0 to the first data channel CH1 is synchronized with the sampling clock CLK by the operation of the flip-flop 47, and then supplied to the first shift register 31a and the timing signal generating circuit 37. At this point, the corresponding exclusive OR circuit 34a outputs a high level pulse signal. The sample signal DIN1 to the second data channel CH2 is likewise synchronized with the sampling clock CLK, and then supplied to the first shift register 31a and the timing signal generating circuit 37 one period later than the first data channel CH1.

When the sample signals DIN0, DIN1 are received by the timing signal generating circuit 37, the sample signals are supposed to be received by the all of the data channels CH1–CH4, so that the timing signal generating circuit 37 outputs the skew recording instruction signal DET. The skew recording instruction signal DET is supplied to clock terminals of the flip-flops 49a–49f in the logic gate circuits 35a–35f of the respective data channels CH1–CH4. This serves to allow the output or logic "1" of the second exclusive OR circuit 34b to pass through the flip-flop 49b the logic AND circuit 50b in the corresponding logic gate circuit 35b in the first data channel CH1. At the same time, the other flip-flops 49a, 49c–49f allow the outputs "0" to pass through to the corresponding logic AND circuits 50a, 50c–50f. In the second data channel CH2, the flip-flop 49a allows the output "1" of the exclusive OR circuit 34a to pass through to the corresponding logic AND circuit 50a in the logic gate circuit 35a. At the same time, the other flip-flops 49b49f in the second data channel CH2 allow the outputs "0" to pass through to the corresponding logic AND circuits 50b–50f. The respective flip-flops 49a, 49b in the first and second data channels CH1, CH2 maintain their outputs until reset is effected. Accordingly, the output of the first shift register 31a appears at the OR circuit 36 in the first data channel CH1 while the output of the flip-flop 47, namely, the input to the first register 31a appears at the OR circuit 36 in the second data channel CH2.

As described above, a data path is established in the first data channel Ch1 from the output of the first shift register 31a to the OR circuit 36 based on the skew recording instruction signal DET from the timing signal generating circuit 37, while a data path is likewise established in the second data channel CH2 from the output of the flip-flop 47 to the OR circuit 36, in the same manner as the previous embodiment. The data paths are recorded in the parallel data skew detecting circuit 45.

Figure 7:
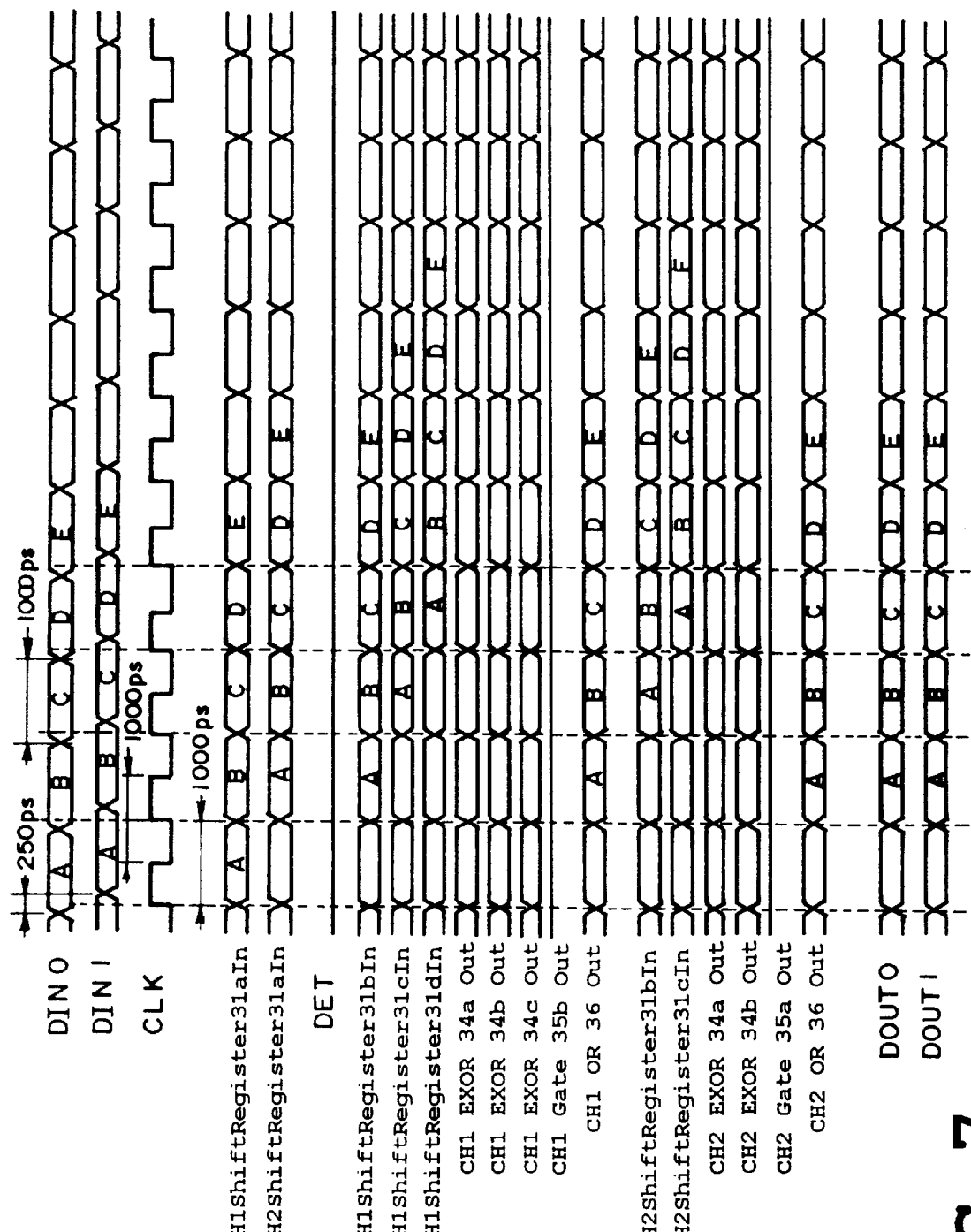
FIG. 7 is a timing chart for showing the operation of compensating skew in parallel data channels and outputting data signals.

When subsequent data signals A-E are supplied to the first and second data channels CH1, CH2 as shown in FIG. 7, the respective shift register sets 31 in the first and second data channels CH1, CH2 sequentially transport the data signals A–E from one shift register to the other. The output of the first shift register 31a is guided along the recorded data path in the first data channel Ch1, while the output of the flip-flop 47 is guided along the recorded data path in the second data channel CH2. Accordingly, the respective data signals A–E are simultaneously output from the first and second data channels CH1, CH2. The skew of 250 ns is compensated.

Figure 6:
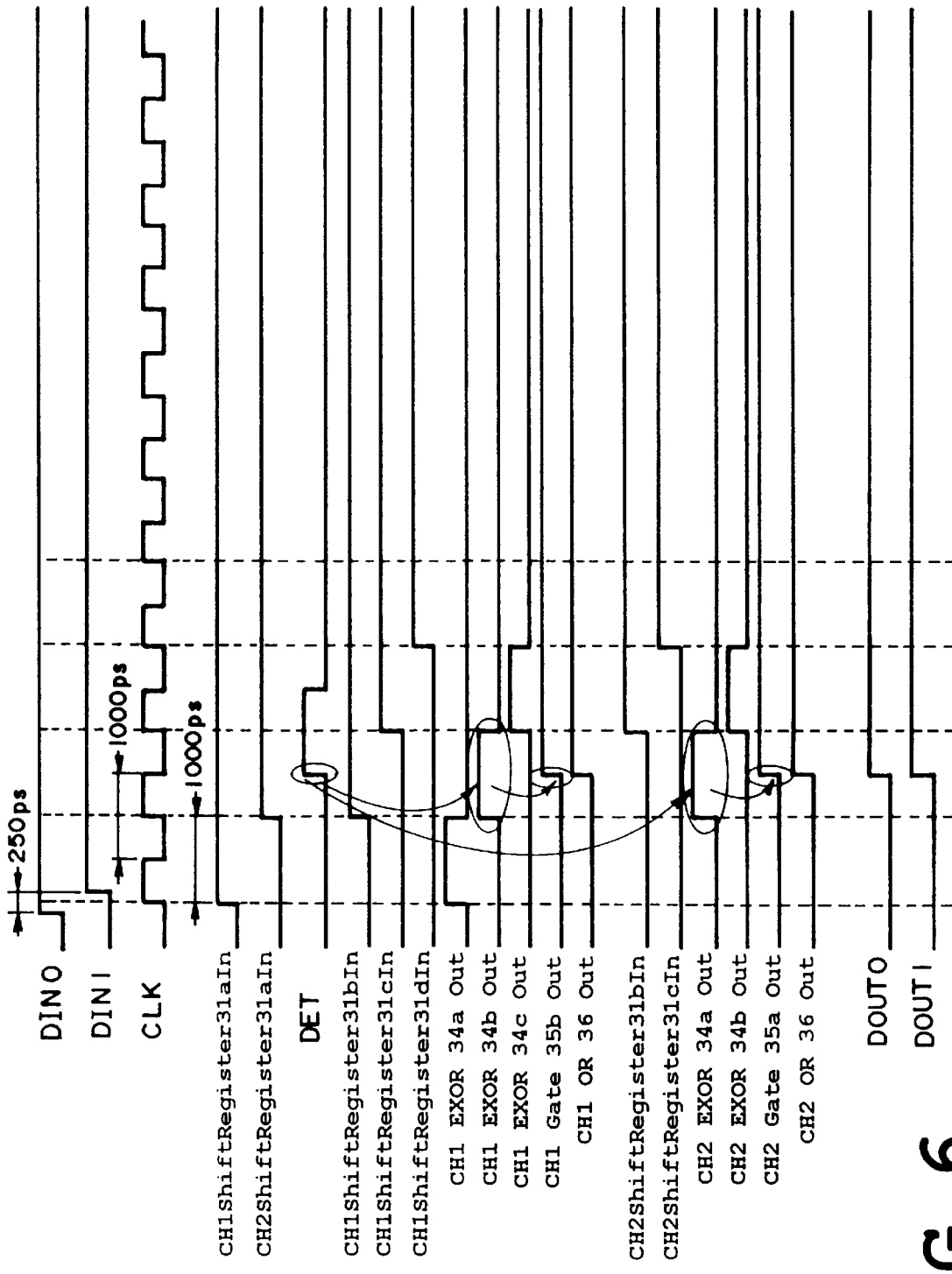
FIG. 6 is a timing chart for showing the operation of detecting skew in parallel data channels based on a sample signal.
Figure 8:
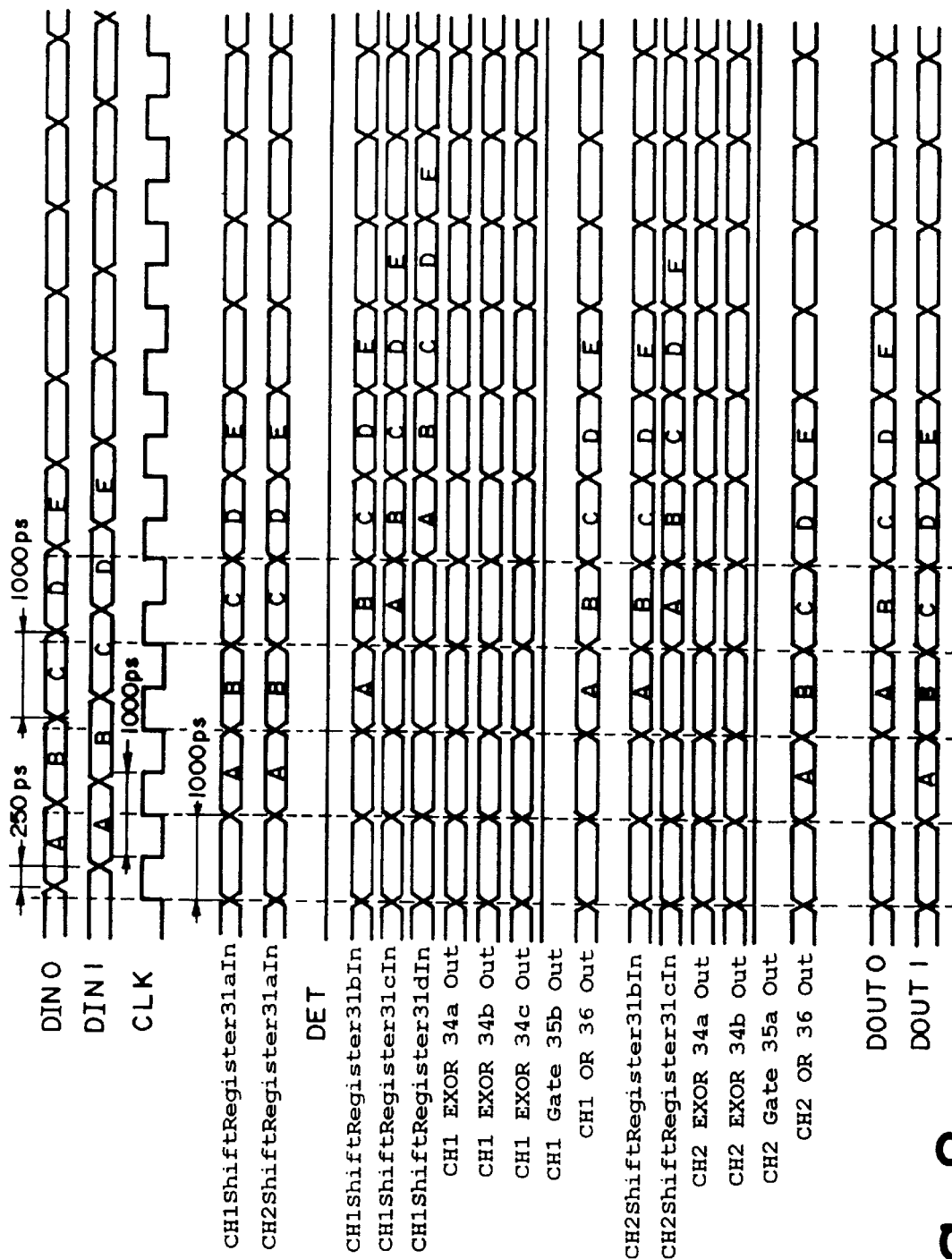
FIG. 8 is a timing chart for showing the operation of compensating skew in parallel data channels and outputting data signals when the synchronization of the skew to the sampling clock is displaced in the data signals.

As is apparent from the comparison between FIGS. 6 and 8, the slippage of the clock of a sample signal to the sampling clock CLK does not always coincide with that of the clock of a subsequent data signal. Skew may appear in the timing different from the sample signal with respect to the sampling clock CLK as shown in FIG. 8. The skew of 250 ps identical to FIG. 7 cannot be compensated, or even enlarged to skew of 1 ns at the output from the parallel data skew detecting circuit 45 in FIG. 8.

From the foregoing, a period T or rate of the sampling clock CKL may cause an error in the skew compensating operation.

It can be understood that, the faster the rate of the sampling clock CLK gets, the smaller the error becomes. However, as the rate of the sampling clock CLK gets faster, the shift register set 31 requires more shift registers so that enough skew detecting period can be insured. It is accordingly preferable that the rate of the sampling clock CLK is set at minimum twice the data transmission rate of parallel transmission data.

Figure 9:
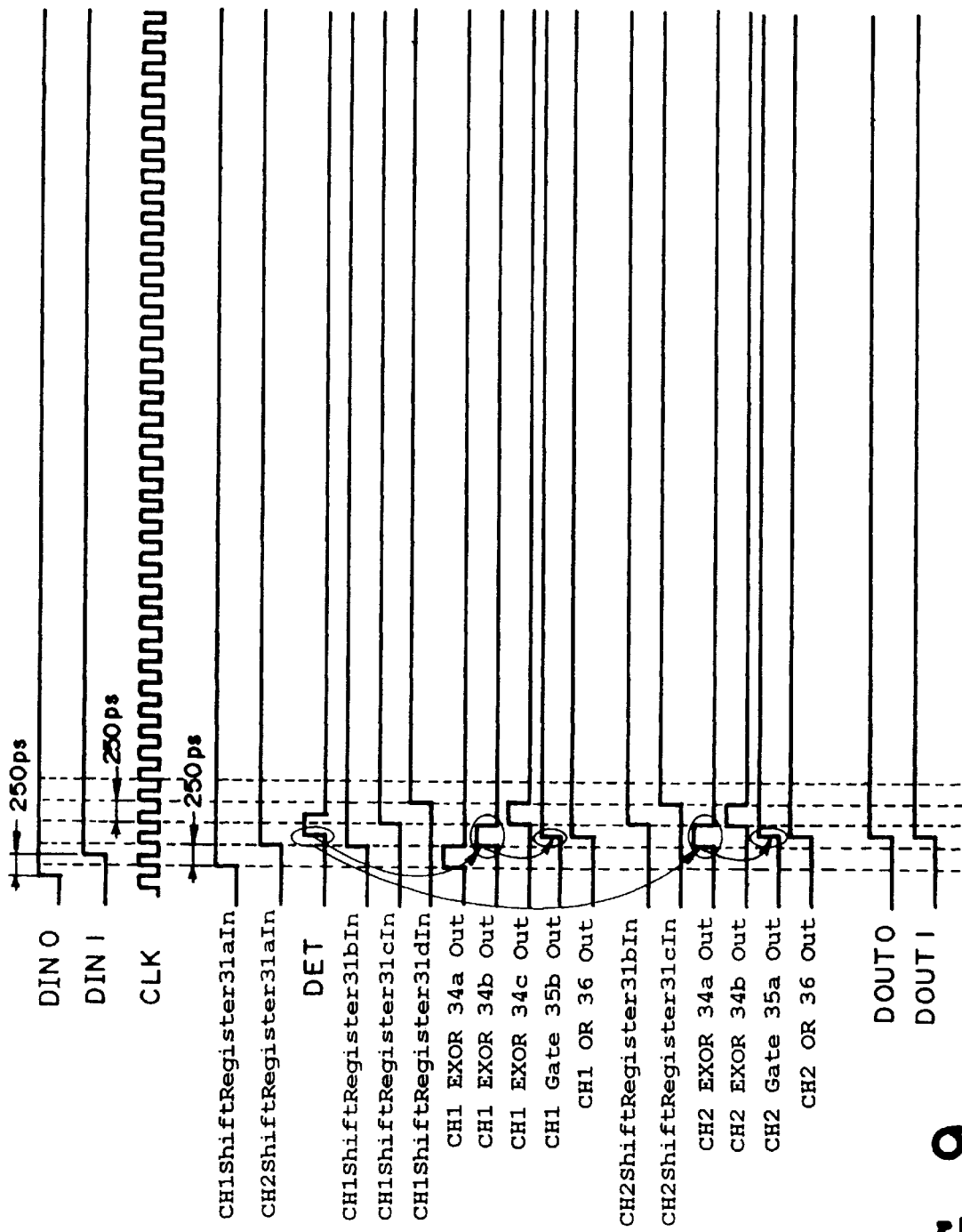
FIG. 9 is a timing chart for showing the operation of detecting skew in parallel data channels based on a sample signal.

FIG. 9 illustrates the timing chart in case where a sampling clock CLK having a period T=250 ps (rate of 4 GHz) is employed in place of the sampling clock CLK with T=1 ns. The shift register set 31 sequentially transports data signals from one shift register to the other by 250 ps. The skew detecting period is accordingly set to 1.5 ns. The number of shift registers in the shift register set 31 may be increased to lengthen the skew detecting period. For example, if the aforementioned skew detecting period of 6ns should be maintained, the shift register set 31 may comprise twenty-four shift registers.

Referring to FIG. 9, suppose that the second data channel CH2 receives the sample signal 250 ps later than the first data channel Ch1 in the same manner as mentioned above. A data path is established in the first data channel CH1 from the output of the first shift register 31a to the OR circuit 36, while a data path is likewise established in the second data channel CH2 from the output of the flip-flop 47 to the OR circuit 36 in the parallel data skew detecting circuit 45 as mentioned above. These data paths are recorded in the parallel data skew detecting circuit 45.

Figure 10:
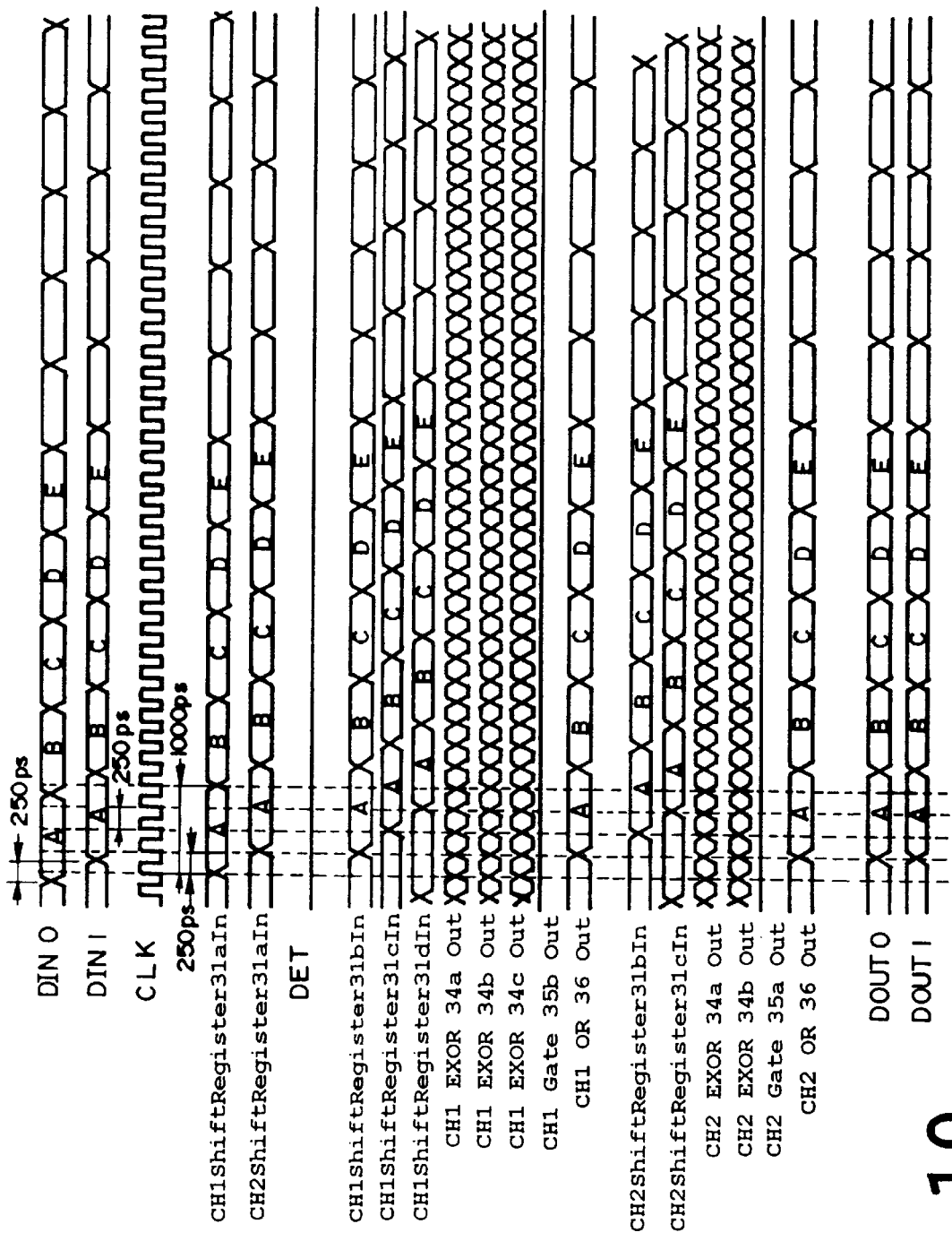
FIG. 10 is a timing chart for showing the operation of compensating skew in parallel data channels and outputting data signals.
Figure 11:
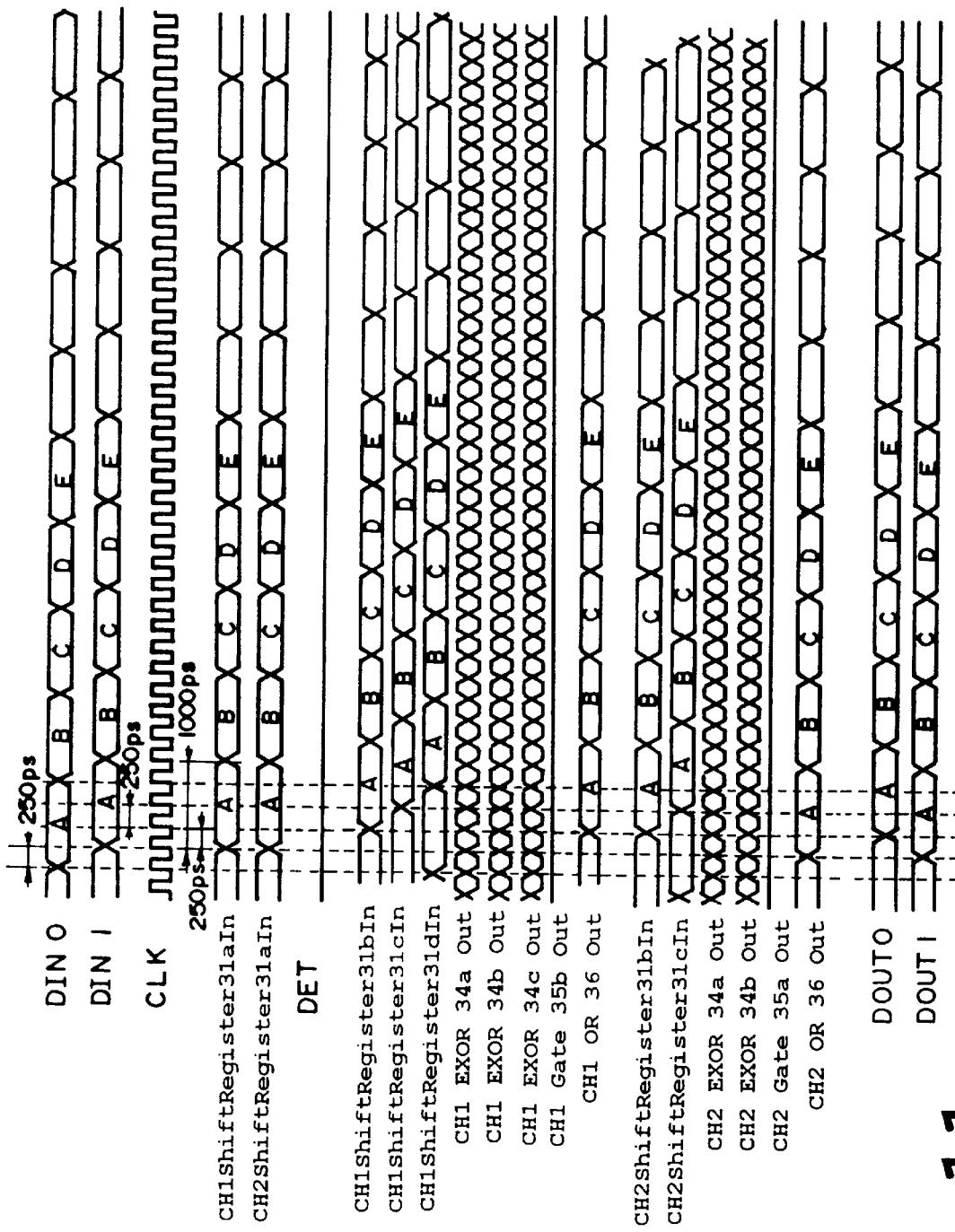
FIG. 11 is a timing chart for showing the operation of compensating skew in parallel data channels and outputting data signals when the synchronization of the skew to the sampling clock is displaced in the data signals.

When subsequent data signals A-E are supplied to the first and second data channels CH1, CH2 as shown in FIGS. 10 and 11, the data signals A–E are synchronized with the sampling clock CLK and received by the parallel data skew detecting circuit 45. If the slippage of the clock in the parallel transmission data to the sampling clock CLK coincides with that of the sample signal as shown in FIG. 10, the data signals A–E are simultaneously output from the first and second data channels CH1, CH2. On the other hand, if the slippage of the clock in the parallel transmission data fails to coincide with that of the sample signal as shown in FIG. 11, the data signals A–E are output with skew of 250 ps still remaining. Specifically, this parallel data skew detecting circuit 45 cannot compensate skew below 250 ps, namely, the rate of the sampling clock CLK. However, only 250 ps of the remaining skew for data clock of 1 ns will not greatly affect subsequent processing at the later stages.

Although two embodiments are particularly described above, the present invention is not limited to the disclosed embodiments. The present invention may be applied to any input/output unit such as workstations and/or personal computers which employ parallel interface. The parallel transmission data cannot be limited to 12 bits or 4 bits. Data transmission may be established over any medium other than fiber-optic cables.

What is claimed is:

1. A parallel data skew detecting circuit, comprising:

a plurality of parallel data channels including a plurality of serial shift registers to transmit a sample signal;

a timing signal generating circuit to generate a timing signal in a predetermined period;

a skew storage circuit to record the shift register which receives the sample signal for the respective data channels when the timing signal is generated; and a processing completion detecting circuit to detect that all of the data channels have received the sample signal within a skew detecting period defined by the number of the shift registers, and to output a completion signal upon completion of the detection, to thereby confirm that skew is detected.

2. The parallel data skew detecting circuit according to claim 1, wherein said sample signal comprises at least an edge which rises up to a data value level, and a constant level portion which maintains the data value level continuous to the edge.

3. The parallel data skew detecting circuit according to claim 1, wherein said timing signal generating circuit generates the timing signal to allow the shift register which receives the sample signal to be identified when all of the data channels receive the sample signal.

4. The parallel data skew detecting circuit according to claim 3, wherein said timing signal generating circuit receives a reset signal to reset the skew storage circuit.

5. The parallel data skew detecting circuit according to claim 1, further comprising:

an incomplete channel detecting circuit to detect the data channel in which the sample signal has passed through all of the shift registers when said processing completion detecting circuit fails to output the completion signal.

6. The parallel data skew detecting circuit according to claim 1, further comprising:

gate circuit to selectively allow output of a data signal from the shift register recorded in the skew storage circuit in the data channel.

7. The parallel data skew detecting circuit according to claim 1, wherein the data channels are connected to an optical converter circuit which converts an optical signal into an electric signal.

* * * * *